Nov. 29, 1927.
K. W. THALHAMMER
TRIPOD CONSTRUCTION
Original Filed Feb. 14, 1921    2 Sheets-Sheet 1
1,650,747
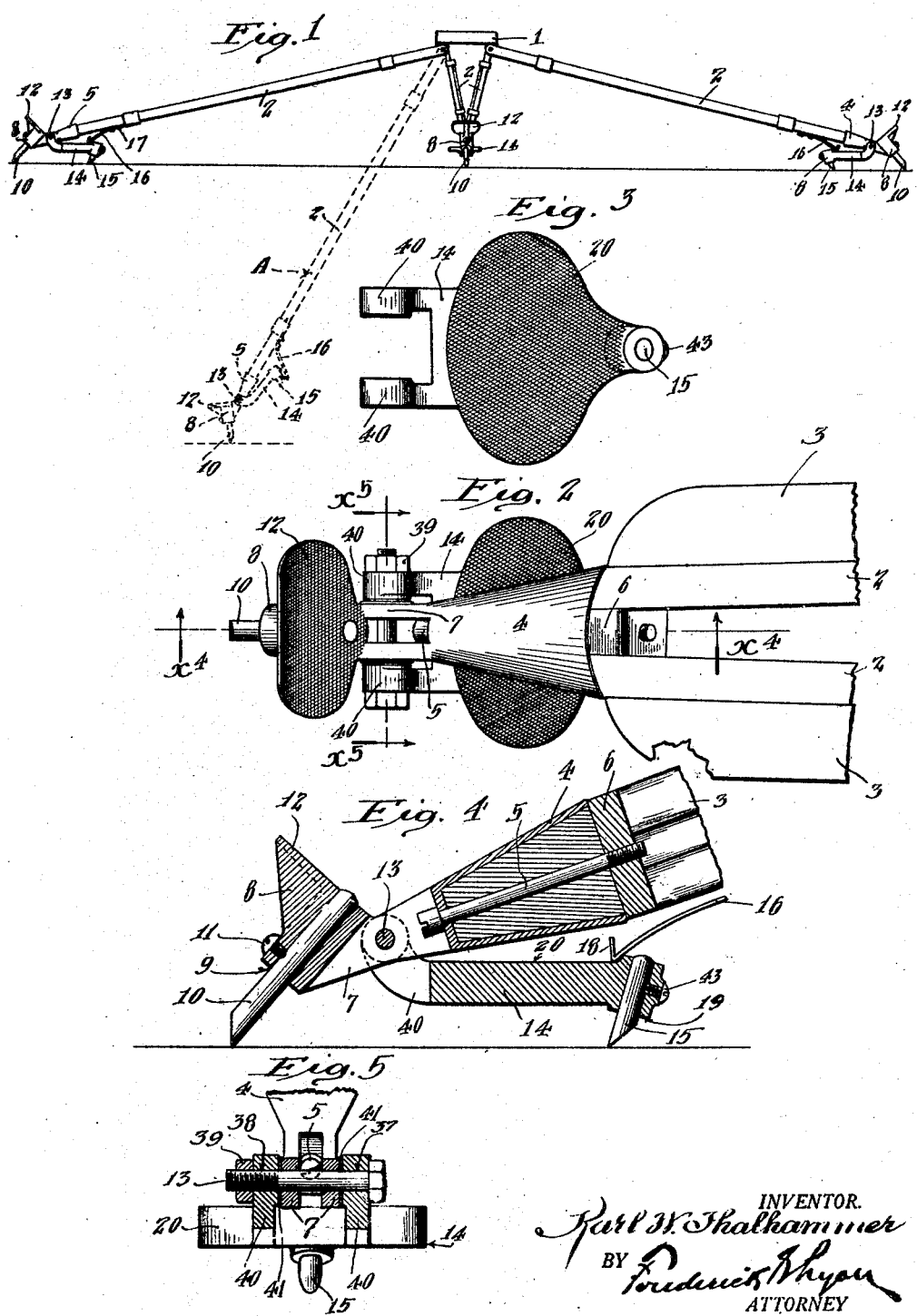
INVENTOR.
Karl W. Thalhammer
BY Frederick Whyou
ATTORNEY

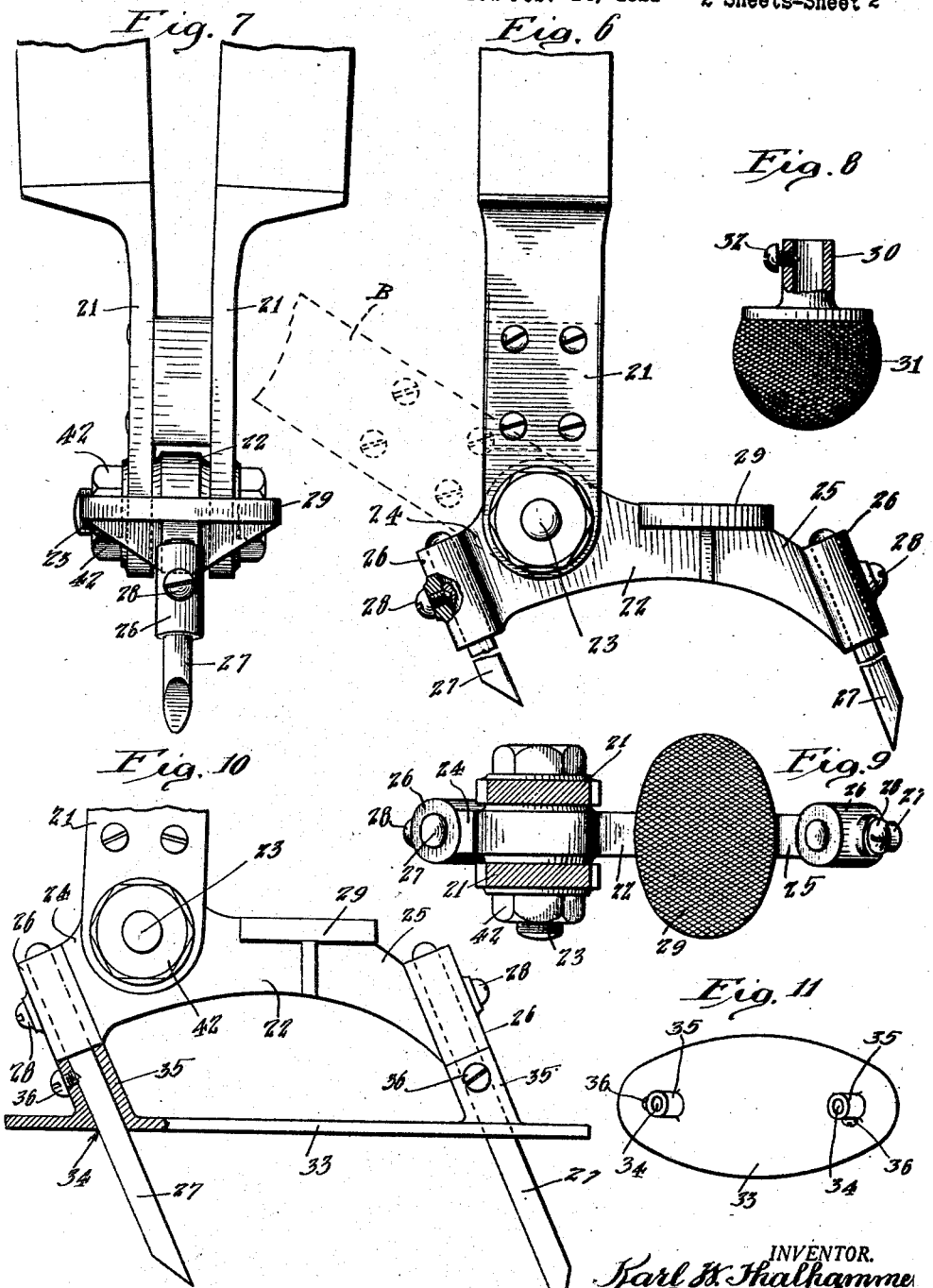

Patented Nov. 29, 1927.

1,650,747

UNITED STATES PATENT OFFICE.

KARL W. THALHAMMER, OF LOS ANGELES, CALIFORNIA.

TRIPOD CONSTRUCTION.

Application filed February 14, 1921, Serial No. 444,860. Renewed December 11, 1924.

This invention relates to tripods of the character employed, for example, as supports for cameras, and the invention is especially useful for adjustably supporting motion picture cameras.

It is requisite, in motion picture photography, that the support for the camera, that is relatively heavy, be securely anchored to the surface on which it rests, so that turning of the crank of the camera will not cause the tripod to slip. It is, therefore, one of the principal objects of this invention to provide a construction which will insure against slippage of the tripod, after it has been placed in the desired position upon a supporting surface, such, for example, as soil, turf, polished floors, etc.

Another object of the invention is to provide for retention of the angle at which the tripod claws engage the supporting surface, regardless of the angle at which the tripod legs are placed.

Another object is to provide a tripod claw which is capable of adjustment relative to the tripod leg.

Another object is to provide a tripod claw which can be advantageously used either on soil, turf, rocks or on hard surfaces, such, for example, as polished floors which it is desired to avoid marring.

The accompanying drawings illustrate several forms of the invention:

Figure 1 is a side elevation of a tripod construction embodying one form of the invention, dotted lines indicating one of the legs moved into a different position than that shown in solid lines.

Figure 2 is an enlarged plan view of the lower end of one of the tripod legs, showing my new construction.

Figure 3 is a plan view of the adjustable claw, detached.

Figure 4 is a sectional elevation on line indicated by $x^4$—$x^4$, Figure 2.

Figure 5 is a sectional elevation on line indicated by $x^5$—$x^5$, Figure 2.

Figure 6 is a side elevation of the lower end of a tripod leg showing a modified form of the invention, broken lines indicating the tripod leg positioned at a different angle than shown in solid lines.

Figure 7 is an elevation of Figure 6 from the right thereof.

Figure 8 is a side elevation, partly in section, of a claw attachment for use on polished floors and the like.

Figure 9 is a plan view of Figure 6, showing the leg in section.

Figure 10 is a side elevation similar to Figure 6, with the shield in place on the claw points.

Figure 11 is a plan view of the shield shown in Figure 10.

In Figure 1 the tripod head is shown at 1 and the adjustable legs at 2. The legs 2 may be of any desired construction, such, for example, as that disclosed in my Patent No. 1,495,458 for tripod, issued May 27, 1924. This form of leg is furcated and the furcations or members 3 are spaced apart as clearly shown in Figure 2. First considering more particularly the form of the invention shown in Figures 1 to 5, the members 3 of each leg seat in a tapered socket 4 through which extends an axial screw 5 that is threaded into an elongate nut 6 extending between the leg members 3.

The socket 4 is joined by spaced ribs 7 to a point seat 8 having a bore 9 to receive a claw point 10 that is removably held in place by a set screw 11 in the seat 8. The head of the screw 5 is accommodated in the inter-rib space. The member 8 forms a foot plate 12 adapted to be engaged by the operator's foot for pressing the point 10 into the earth. It is to be noted that the point 10 is positioned at an angle relative to the longitudinal axis of the tripod leg so that when the tripod leg is swung into almost horizontal position, as in Figures 1 and 4, the point will engage the earth at a great enough angle to securely anchor the tripod leg and prevent it slipping.

Hinged to the ribs 7 by a pivot 13 is a claw 14 having a removable point 15 positioned at an acute angle relative to the longitudinal axis of the claw. The point 15 is retained in place by a set screw 43. When the tripod leg is extended as in Figure 1, both points 10 and 15 may be readily brought into engagement with the surface on which the tripod is to stand, thus insuring against slipping of the tripod leg, since, if one of the points should fail to hold, the other point probably would.

When the tripod leg is swung into the more upright position indicated in broken lines at A, Figure 1, the claw 14 may be swung alongside of the tripod leg and may be releasably secured in the folded position by a spring 16 fastened at 17 to the tripod leg, the free end of the spring forming a hook 18 adapted to engage beneath a shoulder 19 on the outer end of the claw 14. When the point 15 engages the earth, as in Figure 4, the free end of the spring 16 presses upon the upper face of the claw 14, thus tending to force the point 15 toward the earth or other surface on which the tripod rests.

The claw 14 is provided with a foot plate 20 for engagement by the operator's foot to thereby move the claw 14 to force the point 15 into the surface on which the tripod rests.

Now referring more particularly to the form of the invention shown in Figures 6, 7, 9 and 10, the tripod leg is of slightly different construction from those shown in Figure 1 and the two leg members or furcations 21 receive between them the adjustable claw 22 which is pivoted to the leg by a bolt 23 that extends through the leg members 21. The claw 22 is provided with a shorter arm 24 and a longer arm 25, and the arms 24 and 25 are provided at their extremities with point sockets 26, respectively, in which are inserted the claw points 27. The points 27 are detachably secured in place by set screws 28 in the sockets 26.

From the foregoing it will be clear that, whereas in the form of the invention shown in Figures 1 to 5 only one of the claw points is adjustable as to angularity relative to the tripod leg, in the form of the invention last described both points 27 are adjustable as to angularity relative to the tripod leg. The points 27 are positioned at an angle relative to the longitudinal axis of the claw 22 so as to tend to be driven the more securely into the earth when the tripod leg is set at an angle, as indicated in broken lines at B, Figure 6.

The claw 22 is provided with a foot plate 29 for engagement by the operator's foot to adjust the claw 22 and press the points 27 into firm engagement with the surface upon which the tripod rests.

In Figure 8 there is shown a socket 30 attached to a knoblike cushion 31 formed of suitable yielding or cushioning material such, for instance, as rubber. The socket 30 is provided with a set screw 32 whereby the socket may be secured to the tripod point 10, 15 or 27 when the socket has been slipped thereon. Though but one cushion 31 and socket therefor are shown, it is understood that they will be provided for each point, so that when the tripod is used upon a polished floor or other smooth level surface, the floor will not be marred and yet the tripod will be prevented from slipping.

In Figure 10 another attachment is illustrated and comprises a shield in the form of a flat plate 33 provided with holes 34 to receive the points 10, 15 or the points 27. Though the plate is only shown mounted on the points 27, it is clear that it can also be mounted on the points 10, 15, in the form of the invention shown in Figures 1 to 5, if the points 10, 15 be brought into parallelism with each other. In the instance shown, the holes 34 extend through socket members 35 which are provided with set screws 36 adapted to engage the claw points to prevent the plate from slipping therefrom.

The shield 33 will be employed in connection with the claw points, as shown in Figure 10, when the tripod is used on a soft surface such as a lawn, for example, to prevent the claw digging too deeply into the lawn and thus making unsightly holes therein, the claw points producing very small holes and not injuring the lawn. The shield 33 can also be used to advantage when the earth is more or less muddy.

The pivot 13 shown in Figure 5 is in the form of a bolt and passes through a plain hole 37 in one of the ribs 7 and through a screw-threaded hole 38 in the other rib, and the bolt is provided with a nut 39 which functions to lock it against unscrewing. By tightening the bolt up, the furcations 40 of the claw 14 are pressed toward the ribs 7 to increase the friction so that the claw 14 will be secured in any desired position of adjustment. If desired, washers 41 of felt or other friction-producing material may be interposed between the ribs 7 and the furcations 40. The same construction is employed in the form of the invention shown in Figures 6, 7, 9 and 10, the bolt 23 being provided with a nut 42, and it not being necessary to illustrate in detail the other features, since the details of Figure 5 are sufficient to make clear to those skilled in the art how to construct the hinge or pivotal mounting of the claw 22.

I claim:

1. A tripod construction comprising a head, legs pivoted to the head, claws pivotally connected with the respective legs to permit of independent adjustment to different angles relative to the legs when the legs are positioned at different angles relative to the head, each of said claws provided with a plurality of points, and shields, each shield provided with holes to receive the points of one of the claws.

2. A tripod construction comprising a head, legs pivoted to the head, claws hinged to the respective legs to permit of independent adjustment of the claws to different angles relative to the legs when the legs are positioned at different angles relative to the head, each claw provided with points positioned with their longitudinal axes at an angle to the longitudinal axis of the claw, and means to hold each claw in different angular positions relative to the associated leg.

3. A tripod construction comprising a head, legs pivoted to the head, and claws hinged to the respective legs to permit of independent adjustment of the claws to different angles relative to the legs when the legs are positioned at different angles relative to the head, each claw provided with points positioned with their longitudinal axes at an angle to the longitudinal axis of said claw and in parallelism with each other.

Signed at Los Angeles, California, this 7th day of February, 1921.

KARL W. THALHAMMER.